US009098259B1

(12) United States Patent
Lachwani et al.

(10) Patent No.: US 9,098,259 B1
(45) Date of Patent: Aug. 4, 2015

(54) SECURE DIGITAL INPUT/OUTPUT LOW-POWER MODE

(75) Inventors: Manish Lachwani, Sunnyvale, CA (US); David Berbessou, Sunnyvale, CA (US)

(73) Assignee: Amazon Technologies, Inc., Reno, NV (US)

( * ) Notice: Subject to any disclaimer, the term of this patent is extended or adjusted under 35 U.S.C. 154(b) by 375 days.

(21) Appl. No.: 13/116,230

(22) Filed: May 26, 2011

(51) Int. Cl.
*G06F 1/26* (2006.01)
*G06F 1/32* (2006.01)

(52) U.S. Cl.
CPC ..... *G06F 1/26* (2013.01); *G06F 1/32* (2013.01)

(58) Field of Classification Search
CPC ............... G06F 1/01; G06F 1/26; G06F 1/30
USPC .......................................... 713/320, 324, 340
See application file for complete search history.

(56) References Cited

U.S. PATENT DOCUMENTS

| | | | | |
|---|---|---|---|---|
| 6,496,938 | B1* | 12/2002 | Fry et al. | 713/322 |
| 7,194,638 | B1* | 3/2007 | Larky | 713/300 |
| 8,127,309 | B1* | 2/2012 | Huang et al. | 719/321 |
| 8,255,708 | B1* | 8/2012 | Zhang | 713/300 |
| 8,661,171 | B1* | 2/2014 | Krishnan et al. | 710/100 |
| 2003/0056050 | A1* | 3/2003 | Moro | 710/301 |
| 2004/0016808 | A1* | 1/2004 | Kang | 235/441 |
| 2006/0010266 | A1* | 1/2006 | Liu et al. | 710/62 |
| 2006/0075174 | A1* | 4/2006 | Vuong | 710/302 |
| 2007/0055795 | A1* | 3/2007 | Seo et al. | 710/15 |
| 2009/0138628 | A1* | 5/2009 | Kanade | 710/27 |
| 2009/0177816 | A1* | 7/2009 | Marx et al. | 710/72 |
| 2009/0187779 | A1* | 7/2009 | Liu et al. | 713/323 |
| 2009/0193180 | A1* | 7/2009 | Ito | 711/103 |
| 2009/0290547 | A1* | 11/2009 | Chang et al. | 370/329 |
| 2010/0011128 | A1* | 1/2010 | Paycher et al. | 710/1 |

OTHER PUBLICATIONS http://read.pudn.com/downloads149/doc/comm/644429,"SDIO Performance in System and Card"; 24 pages, Dated Mar. 15, 2004.*
http://www.quicklogic.com/assets/pdf/data-sheets/QL-SDIO-Host-Controller-PSB-Data-Sheet.pdf, "Secure Digital Input/Output (SDIO) lookup", 15 pages, Dated 2010.*

* cited by examiner

*Primary Examiner* — Jaweed A Abbaszadeh
*Assistant Examiner* — Phil Nguyen
(74) *Attorney, Agent, or Firm* — Lee & Hayes, PLLC

(57) ABSTRACT

A low-power mode for interfaces, such as secure digital input/output (SDIO) interfaces, is described. The low-power mode provides significant power savings while allowing rapid resumption of data transfer on the interface. The SDIO low-power mode gates an SDIO clock and transitions the SDIO bus to a 1-bit mode. One line of the bus carries the 1-bit data while another line carries interrupts from an SDIO peripheral. Normal data transmission results in enabling the SDIO clock and setting the bus set to the 4-bit mode.

23 Claims, 4 Drawing Sheets

SECURE DIGITAL INPUT/OUTPUT LOW-POWER MODE

BACKGROUND

Electronic devices, such as electronic book readers ("eBook reader devices"), cellular telephones, portable media players, desktop computers, laptops, tablet computers, netbooks, personal digital assistants, and the like, rely on electrical power to function. In the case of mobile devices, a battery with a finite storage capacity often provides power.

To reduce power consumption and extend operating time while using battery, these electronic devices may utilize different operating modes. Traditionally, placing a bus and associated controller into a low power mode while still maintaining reliable connectivity has proven difficult. What is desired is a low power mode for a data transfer bus that allows for significant reduction in power consumption without compromising data transfer reliability.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
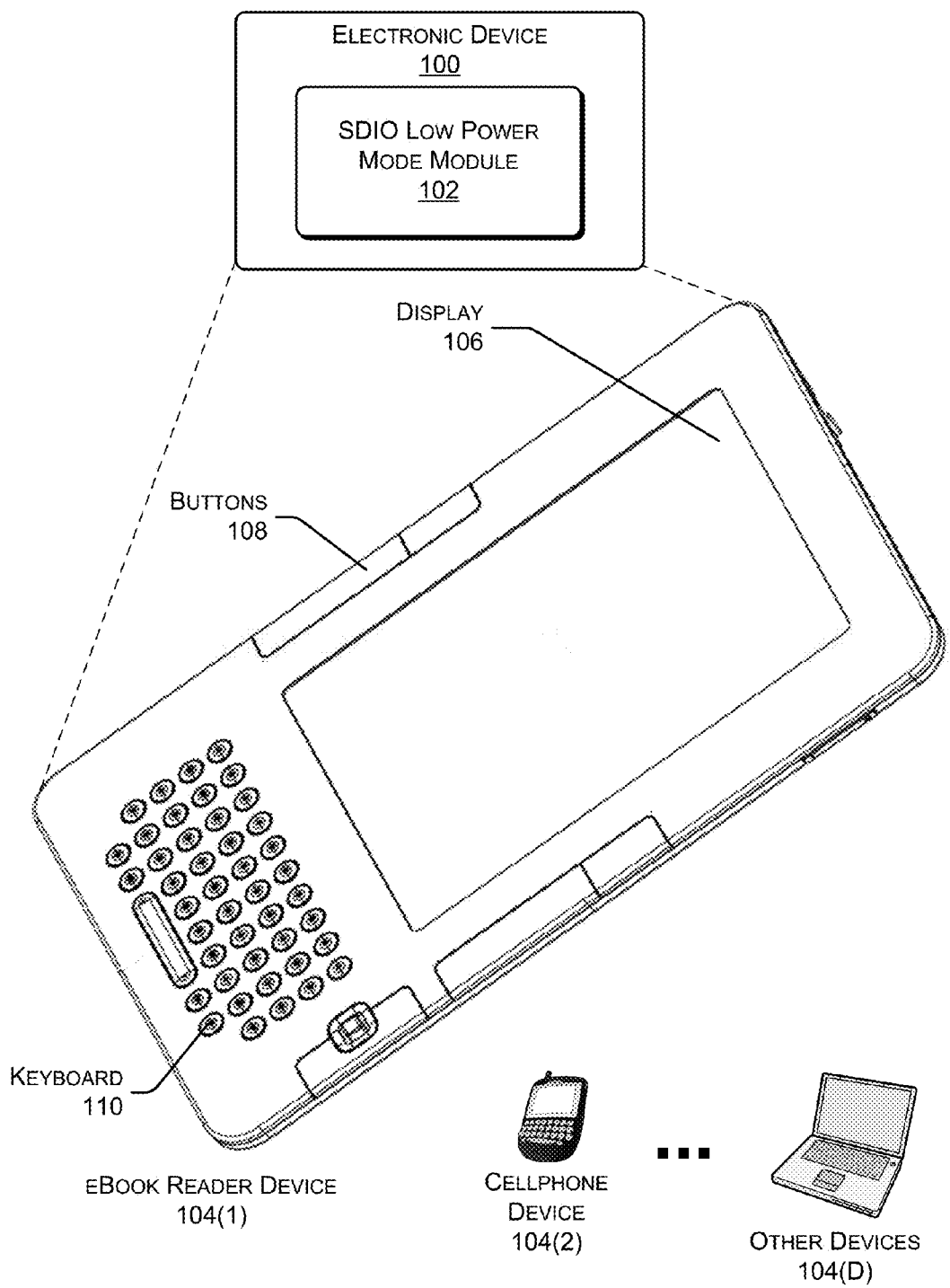
FIG. 1 is an illustrative electronic device (here, an eBook reader device) configured with a secure digital input/output (SDIO) low power mode module for placing the SDIO bus and associated controller within the eBook reader device into a low power mode.

An electronic device may couple to a wide variety of peripherals. Peripherals include memory devices such as hard drives, cameras, global positioning systems, and the like. Peripherals also include additional interfaces such as network interfaces, Bluetooth, Firewire, WiFi, and so forth. Each of these peripherals couple to the electronic device with an interface which includes a bus or pathway to transfer data. This bus may be an electrical conductor, optical fiber, or other electromagnetic coupling between the peripheral and the electronic device. Frequently, clocks and their timing signals coordinate the transfer of data along the bus.

This disclosure describes techniques to allow an interface to reliably transfer between a first mode and a second mode, such as entering a low-power mode and thereafter transitioning back to a full power mode. When the interface is idle, the interface may be placed into a lower bit rate data transmission mode and the interface clock may be gated. For example, with an SDIO interface, the bus may be transitioned from a 4-bit to a 1-bit data transfer mode and the SDIO clock turned off to reduce power consumption. Throughput of the interface is unaffected by the use of the low-power mode described herein.

The interface may awaken and resume normal data transfer at a higher bit rate when an interrupt is received from the peripheral device or when the processor or another portion of the electronic device has data to send to the peripheral device. In such an instance, the SDIO clock is enabled, the SDIO bus is transitioned to 4-bit data transfer mode, and data transfer occurs. Upon completion of the transfer, a command completion response is received from the peripheral indicating no further data is known to be transmitted along the interface. To avoid placing the interface into low power mode when more data is on the way a pre-determined idle time threshold is set. Upon reaching this threshold, such as one second, the interface may enter the low power mode.

While the interface is in the low power mode, the peripheral device may continue to operate in a normal full power mode, or may itself enter a low power mode. When called upon, the interface may then resume normal full power operation with minimal delay.

The secure digital input/output (SDIO) interface is used herein for discussion purposes, and not by way of limitation. The techniques described herein may also be applied to other interfaces including the multimedia card (MMC) interface, Embedded MMC (EMC), Secure Digital (SD), Embedded Secure Digital (ESD), and other interfaces.

The techniques described in this disclosure enable the interface to enter a low power mode. The low power mode results in significant power savings compared to a normal operational mode while maintaining a reasonably fast resumption time. While in low power mode, an interface clock may be gated. This may also permit other clocks to be scaled to a low frequency or gated altogether.

Scaling involves reducing the frequency of a clock, which in turn reduces power consumption. Gating disables at least a portion of a circuit such as a clock, which further reduces power consumption by eliminating switching power consumption. Thus, by scaling and/or gating clocks, power consumption of the interface and thus the entire electronic device is reduced.

To maintain the ability of the interface to respond while the interface clock is gated or scaled in the low power mode, an external clock may provide a timing signal to the interface. This timing frequency may be at a lower frequency than ordinarily provided by the interface clock during normal operation of the bus. This in turn may affect the interface, such as slowing down the available data transfer rate across the bus. The "external clock" may include a clock which is on the same or a separate die from other devices including the interface controller, processor, and so forth. For example, the i.MX architecture and ATLAS power management integrated circuit from Freescale™ Semiconductor Incorporated, of Austin, Tex., United States of America, is one suitable family of devices.

While the interface is in the low power mode, it is important to note that the peripheral device, or other subsystems within the electronic device, may or may not be in low power modes of their own. For example, the interface may be in the low power mode while a wireless network interface peripheral device remains connected to an access point. This allows for the interface to be placed into the low power mode, while still maintaining connectivity and compliance with wireless network standards such as WiFi.

A processor may be configured to control the interface and determine when to place the interface into the low power mode. The processor executes an operating system, including, but not limited to, Linux®, UNIX®, Microsoft Corporation's Microsoft Windows®, Microsoft Corporation's Windows Mobile®, Apple Corporation's Mac OS®, Apple Corporation's Mac OS X®, and Wind River Systems Inc.'s VxWorks®.

For example, an eBook reader or other electronic device may incorporate a Freescale™ processor having an i.MX architecture with an SDIO interface and executing a Linux® kernel. Other processors and architectures may also be used including, but not limited to, the Open Multimedia Application Platform (OMAP) architecture from Texas Instruments™. The kernel uses device drivers to communicate with the peripheral devices such as the external memory interfaces (EMIs), Universal Serial Bus (USB) controllers, image processing units (IPUs), wireless network interfaces, memory devices, and so forth. The peripheral devices may reside on the same "chip" or die as the processor and/or may reside on another die.

While these techniques are described in terms of an eBook reader device, the concepts described herein may also be applicable to cellular telephones, portable media players, desktop computers, laptops, tablet computers, netbooks, personal digital assistants, or other electronic devices.

Illustrative eBook Reader Device

FIG. 1 depicts an illustrative electronic device 100 having a display, a touch sensor, user controls, and an SDIO low power mode module 102. Briefly, the SDIO low power mode module 102 places the SDIO interface within the device 100 into a low power mode where an interface clock is gated. While in the low power mode, the SDIO interface consumes significantly less power than compared to a normal operational mode. This reduces overall power consumption by the electronic device. The peripheral device is left unaffected and may continue to operate until there is data to transfer, in which case the interface may resume from the low power mode in a reasonably short amount of time.

The electronic devices 100 include cellular phones, portable media players, tablet computers, netbooks, laptops, personal computers, cash registers, electronic book ("eBook") readers, servers, medical devices, data acquisition devices, and so forth. Because of this wide applicability, several devices are shown in this illustration that may utilize the SDIO low power mode module 102. For example, an electronic book (eBook) reader device 104(1) is shown embodied as a handheld, dedicated eBook reader device. FIG. 1 also illustrates that a cellphone device 104(2) and other devices 104(D), such as a netbook computer, may include and implement the deep idle mode module 102. As used herein, letters within parenthesis such as "(D)" indicate an integer greater than zero.

The eBook reader device 104(1) may have a display 106 to present content in a human-readable format to a user. The display 106 may be reflective, emissive, or a combination of both. Reflective displays utilize incident light and include electrophoretic displays, interferometric modulator displays, cholesteric displays, and so forth. Emissive displays do not rely on incident light and, instead, emit light. Emissive displays include backlit liquid crystal displays, time multiplexed optical shutter displays, light emitting diode displays, and so forth. When multiple displays are present, these displays may be of the same or different types. For example, one display may be an electrophoretic display while another may be a liquid crystal display.

For convenience only, the display 106 is shown in a generally rectangular configuration. However, it is understood that the display 106 may be implemented in any shape, and may have any ratio of height to width. Also, for stylistic or design purposes, the display 106 may be curved or otherwise non-linearly shaped. Furthermore the display 106 may be flexible and configured to fold or roll.

The content presented on the display 106 may take the form of electronic books or "eBooks." For example, the display 106 may depict the text of the eBooks and also any illustrations, tables, or graphic elements that might be contained in the eBooks. The terms "book" and/or "eBook," as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, and so forth. Accordingly, the terms "book" and/or "eBook" may include any readable or viewable content that is in electronic or digital form.

The electronic device 100 may include a touch sensor for user input. For example, the display 106 of the eBook reader device 104(1) may include a touch sensor, resulting in a touch screen that allow user input through contact or gesturing relative to the display.

The eBook reader device 104(1) may also incorporate one or more user actuable controls such as buttons 108 and a keyboard 110 for user input. The one or more user actuable controls may have dedicated or assigned operations. For instance, the user actuable controls may include page turning buttons, a joystick, navigational keys, a power on/off button, selection keys, and so on.

While one embodiment of an electronic device 100 is shown in relation to the eBook reader device 104(1), it is understood that electronic devices include cellular telephones 104(2), and other devices 104(D) such as portable media players, tablet computers, netbooks, laptops, personal computers, cash registers, servers, medical devices, data acquisition devices, and the like.

Figure 2:
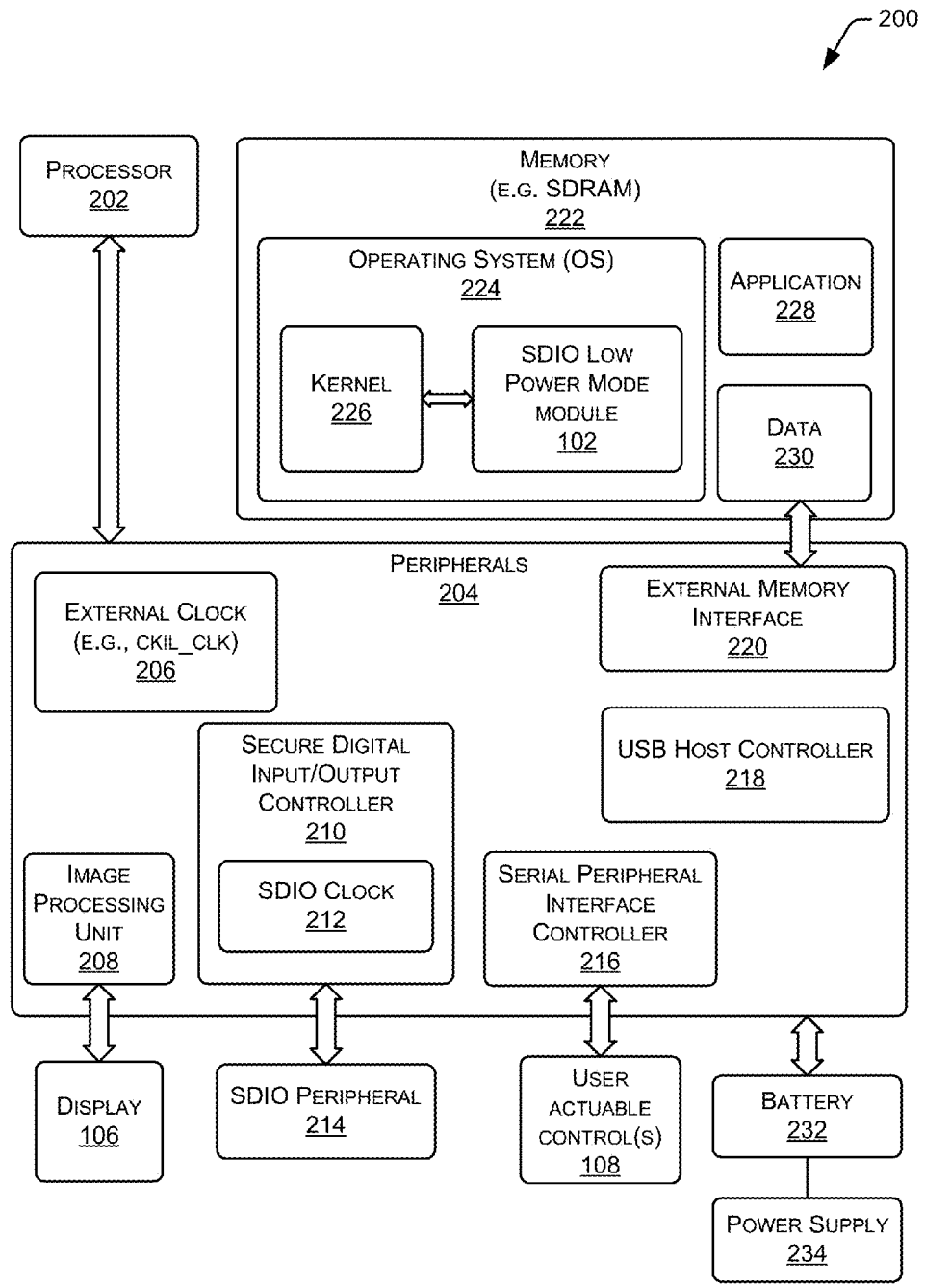
FIG. 2 is an illustrative schematic of the electronic device configured to use the SDIO low power mode module of FIG. 1.

FIG. 2 is a block diagram 200 of the illustrative electronic device 100 showing the internal components. In a very basic configuration, the device 100 includes or accesses components such as a processor 202 and one or more peripherals 204. Each processor 202 may itself comprise one or more processors.

The peripherals 204 couple to the processor 202. Among these peripherals is an external clock 206. The external clock 206 is configured to provide a timing signal. In some implementations this external clock 206 may be a low frequency clock having a frequency of less than 1 MHz. For example, within the i.MX architecture from Freescale™ the external clock 206 may comprise the low frequency external clock designated "ckil" also known as the "32 kHz clock." This clock is external in that it operates independently of other clocks within the system. The external clock 206 may be contained on the same die or a different die as the processor 202. For example, the external clock 206 may be present within a power management integrated circuit (PMIC) such as the Atlas PMIC from Freescale™.

An image processing unit 208 is shown coupled to one or more displays 106. The display 106 presents content in a human-readable format to a user. In some implementations, multiple displays may be present and coupled to the image processing unit 208. These multiple displays may be located in the same or different enclosures or panels. When multiple displays are present, these displays may be of the same or different types. For example, one display may be an electrophoretic display while another may be interferometric. Furthermore, one or more image processing units 208 may couple to the multiple displays.

FIG. 2 further illustrates that the electronic device 100 includes a secure digital input/output (SDIO) controller 210. The SDIO controller 210 may be compliant with the SD specification as promulgated by the SD Card Association of San Ramon, Calif. This includes, but is not limited to versions 1.0, 1.1, and 2.0 of the SD specification. The SDIO controller 210 is configured to operate in a low bit rate data transfer mode and a high bit rate data transfer mode. In one implementation, the low bit rate data transfer mode may be a 1-bit mode using one data line while the high is a 4-bit mode using four data lines. The SDIO controller 210 may have an SDIO clock 212 configured to provide timing signals for the SDIO bus. Coupled to the SDIO controller 210 via the SDIO bus is one or more SDIO peripherals. As described above, these peripherals may include memory devices, network interfaces, cameras, and so forth. For example, the peripheral may comprise a wireless module configured to allow for connection to wireless local or wireless wide area networks ("WWAN"). The wireless module may include a modem configured to send and receive data wirelessly and one or more antennas suitable for propagating a wireless signal. In other implementations, a wired network interface may be provided.

Also shown is a serial peripheral interface ("SPI") controller 216 and associated SPI bus. The SPI bus allows for synchronous serial data exchange. SPI is also known as a "four-wire" serial bus due to the number of conductors used. In some implementations, the SPI controller 208 may also be considered the SPI bus master.

Various peripherals may couple to the device via SPI or other interfaces. For example, one or more user actuable controls 108 may couple to the device via the SPI controller 216. These user actuable controls 108 may have dedicated or assigned operations, and may include page turning buttons, a joystick, navigational keys, a touch sensor, a power on/off button, selection keys, and so on.

The peripherals 204 may include a USB host controller 218. The USB host controller 218 manages communications between components attached to a universal serial bus ("USB") and the processor 202, as well as other peripherals.

The electronic device 100 may also include an external memory interface ("EMI") 220 coupled to external memory 222. The EMI 220 manages access to data stored in the external memory 222. The external memory 222 may comprise Static Random Access Memory ("SRAM"), Pseudo-static Random Access Memory ("PSRAM"), Synchronous Dynamic Random Access Memory ("SDRAM"), Double Data Rate SDRAM ("DDR"), Phase-Change RAM ("PCRAM"), or other computer-readable storage media.

The external memory 222 may store an operating system 224 comprising a kernel 226 operatively coupled to the SDIO low power mode module 102. The SDIO low power mode module 102 also operatively couples to the SDIO controller 210 and associated peripherals. The external memory 222 may also store executable applications 228 as well as data 230, which may comprise content objects for consumption on the electronic device 100, databases, user settings, configuration files, device status, and so forth.

The electronic device 100 may include one or more other, non-illustrated peripherals, such as a hard drive using magnetic, optical, or solid state storage to store information, a firewire bus, a Bluetooth™ wireless network interface, a camera, a global positioning system, a PC Card component, and so forth.

One or more batteries 232 may provide operational electrical power to components of the electronic device 100 for operation when the device is disconnected from a power supply 234. Operational electrical power is sufficient to provide for operation of the device, as distinguished from the lesser electrical power requirements of the low power mode. Power supply 234 may be internal or external to the electronic device 100. The power supply 234 is configured to provide operational power for electronic device 100, charge battery 232, or both. "Battery" as used in this application includes components capable of acting as a power source to an electronic device. Power sources include chemical storage cells such as lithium polymer batteries; charge storage devices such as ultracapacitors; fuel cells, and so forth.

Couplings, such as that between kernel 226 and the SDIO low power mode module 102, are shown for emphasis. There are couplings between many of the components illustrated in FIG. 2, but graphical arrows are omitted for clarity of illustration.

Illustrative Controller, Bus, and Power Consumption

Figure 3:
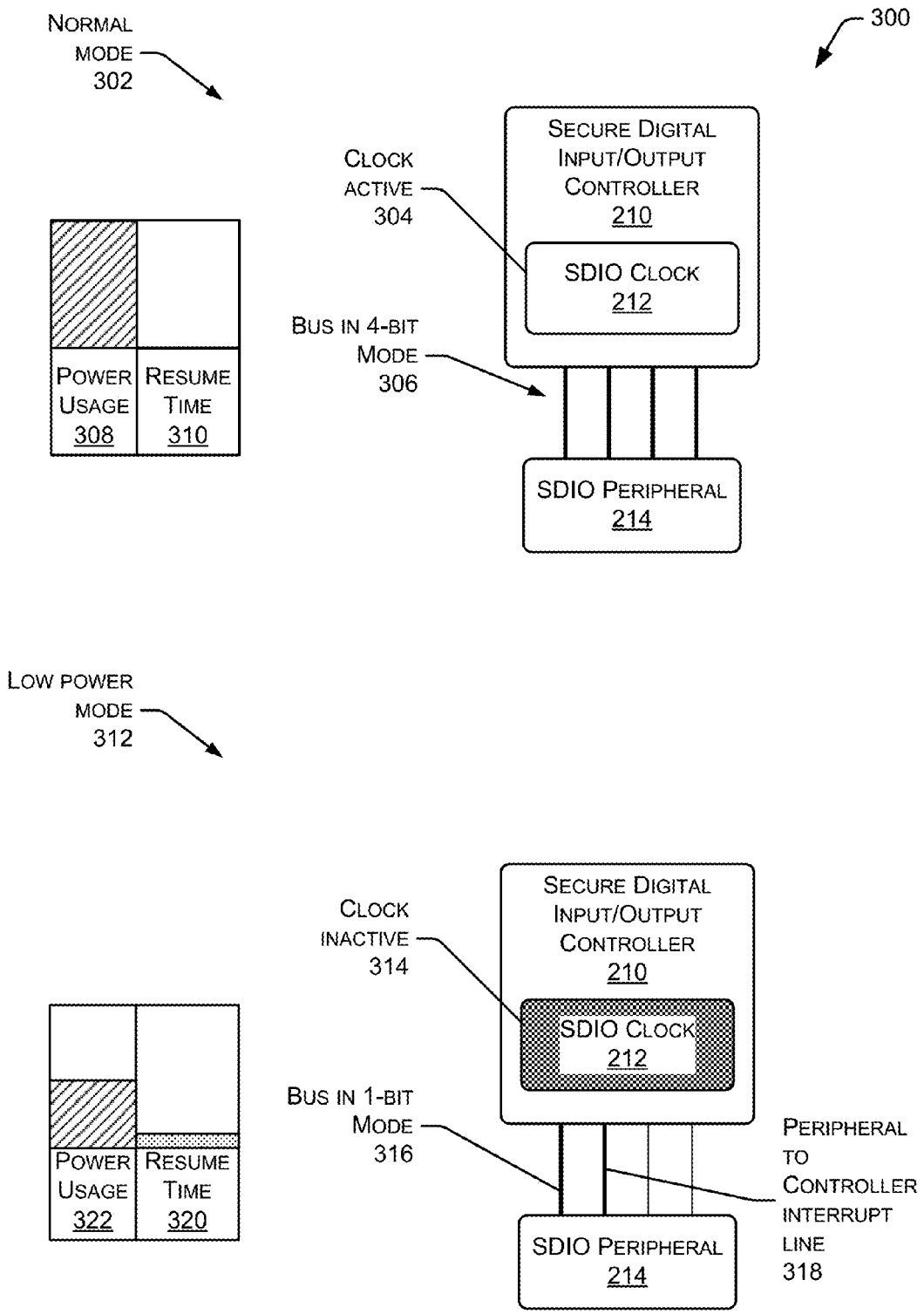
FIG. 3 is an illustrative schematic of the SDIO interface in normal and low power modes. This figure also illustrates relative power usage and resumption times for these different modes.

FIG. 3 is an illustrative schematic 300 of the SDIO controller, clock, and bus in normal and low power modes. The SDIO interface in first mode, such as a normal mode 302 shown here. In this first mode, the SDIO clock 212 is active 304 and the SDIO bus is in 4-bit mode 306 and configured to transfer data between the SDIO peripheral 214 and the SDIO controller 210. In some implementations, while in the normal mode the SDIO controller 210 may poll the SDIO peripheral 214 at a pre-determined interval such as 10 milliseconds (ms).

As shown here, in the normal mode 302, the power usage 308 is at its highest due at least in part to the active clock 304. For example, in some implementations the interface may draw about 45 milliamps (mA) when in the normal operating state but with no significant data transfer taking place. No resume time 310 is shown because the device is in the normal operating mode and is immediately available to pass traffic.

Shown beneath the interface is normal mode is the interface in a second, different, low power mode 312. Here, the inactive clock 314 of the SDIO controller 210 is shown, and the bus is in 1-bit mode 316. A first data line, such as DAT 0 in the SDIO specification is shown configured for data transfer. A second data line, such as DAT 1 has been reconfigured as a peripheral-to-controller interrupt line 318.

While in the low power mode 312, the power consumption has been significantly reduced. For example, in some implementations the interface in the low power mode may draw about 27 mA. Also shown is a resume time 320, which is now slightly increased. This slight increase accounts for time taken to enable the SDIO clock 212, reconfigure the bus from 1-bit to 4-bit transfer mode, and so forth. In some implementations, this time may take 100 ms or less. This low latency in the resumption of activity, as well as the ability for the interface to still be able to receive interrupts from the SDIO peripheral, allows the SDIO peripheral 214 to continue normal operation. For example, consider where the SDIO peripheral 214 comprises a wireless network card complying with the WiFi standard. During periods where no data transfer is actively taking place between the card and the electronic device, the card may remain associated with a WiFi access point even while the SDIO controller has been placed into the low power mode 312. Upon receipt of data to or from the card, normal operation resumes in under 100 ms. Because the WiFi card remained active and associated, there is no need for time consuming re-association with the access point, reducing overall latency and improving the user experience.

In some implementations the bus may enter the low power mode 312 for reasons in addition to, or instead of reducing power consumption. For example, it may be desirable to reduce a level of electromagnetic noise generated by operation of the bus within the electronic device 100 at particular times by entering the low power mode 312 described herein.

Illustrative Processes for Low Power Mode

The processes described herein may be implemented by the architecture described above, or by other architectures. These processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

Figure 4:
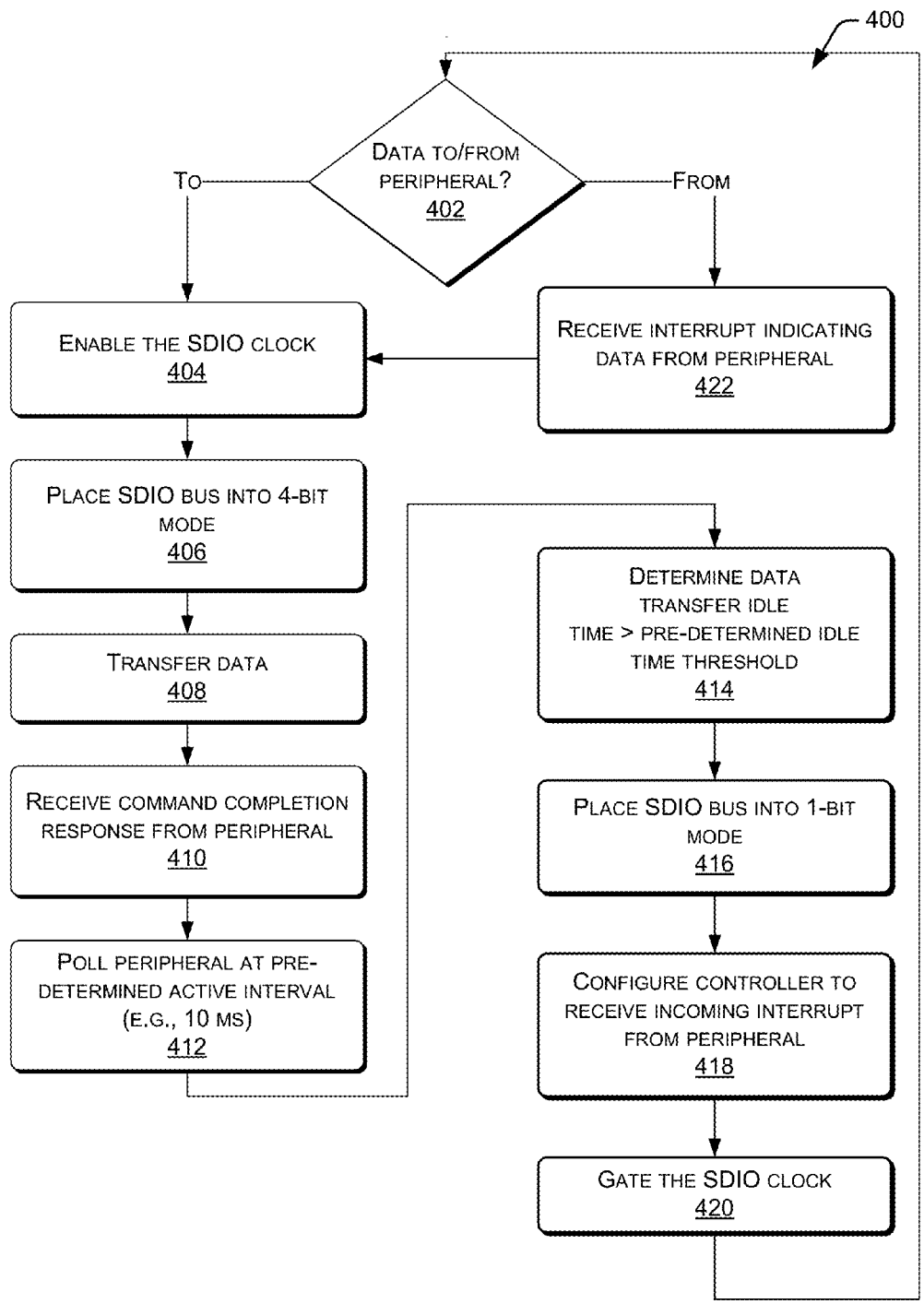
FIG. 4 is an illustrative process of transitioning the SDIO interface between normal mode and low power mode.

FIG. 4 is an illustrative process 400 for transitioning the SDIO interface between normal mode and low power modes. At 402, a determination is made as to whether a transfer of data to or from the peripheral along the interface is received. When at 402 this data is determined to be from the controller 210 to the SDIO peripheral 214 and the low power mode is engaged, the process proceeds to 402. At 404 the SDIO clock 212 is enabled. At 406, the SDIO bus transitions from a 1-bit to a 4-bit data transfer mode. At 408, the data may be transferred along the bus between the controller 210 and the attached peripheral 214.

At 410, a command completion response is received from the peripheral. The command completion response confirms that the data transfer between the peripheral 214 and the controller 210 is complete. At 412, in some implementations the controller 210 may poll the peripheral 214. This polling may occur at pre-determined intervals, such as every 10 ms. However, as discussed above, polling the device and maintaining the bus in the normal operating mode when no data transfer is taking place results in power consumption to maintain the SDIO clock 212, and so forth.

At 414, a data transfer idle time exceeds a pre-determined idle time threshold is determined by the controller. The data transfer idle time indicates an elapsed time since the last transfer of data. In some implementations, this may exclude polling commands. For example, the data transfer idle time may reset upon a block transfer of data between the controller 210 and the peripheral 214, but continue counting a period as idle which contains polling requests. The pre-determined idle time threshold may be static or dynamically adjusted, and indicates how long the bus is to be idle before designating it as idle and entry into the low power mode is appropriate. For example, in some implementations the pre-determined idle time threshold may be about one second. Thus, after one second of no data transfers (or only routine polling requests), the low power mode may be engaged.

At 416, entry into the low power mode begins by placing the SDIO bus into a 1-bit data transfer mode. When placed into this 1-bit transfer mode, of the four data lines DAT 0 to DAT 3 which are available in the SDIO specification, the single bit data is transmitted along DAT 0 and the DAT 1-3 lines are unused.

At 418, the SDIO controller 210 is configured to receive incoming interrupts from the SDIO peripheral 212 on one of the lines, such as DAT 1, in the SDIO bus. The SDIO peripheral 214 may also be configured to generate interrupts using the designated line. This allows the SDIO peripheral 214 to awaken the SDIO controller 210 from the low power mode.

At 420, the SDIO clock 212 is gated. While the SDIO controller 210 is in the 1-bit mode, the lower speed external clock 206 is used for timing to maintain the low speed communication along the bus. Once gated, the SDIO clock 212 power consumption drops significantly. For example, in some devices this may result in a power savings of about 27 mA. The SDIO controller 210 and bus are now in the low power mode.

Returning to 402, when the peripheral 214 calls for a transfer of data along the bus, the process proceeds to 422. At 422 the SDIO controller 210 receives the interrupt indicating that a data transfer from the peripheral 214 is called for. As described above, this may be in the form of an interrupt signal sent along the DAT 1 line on the SDIO bus. The SDIO controller 210 receives this interrupt, and may proceed to 404 in the process to resume normal operation from the low power mode.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. One or more non-transitory computer-readable storage media storing instructions that, when executed by a processor, cause the processor to perform acts comprising:

while a secure digital input/output (SDIO) bus of an electronic device resides in a first mode, determining that an elapsed time since a last transfer of data over the SDIO bus of the electronic device coupled to a wireless network interface within the electronic device exceeds a time threshold; and causing the SDIO bus of the electronic device to enter a second mode at least partly in response to the determining the elapsed time since the last transfer of data over the SDIO bus exceeds the time threshold, wherein the wireless network interface within the electronic device is configured to maintain connectivity with an access point while the SDIO bus is in the second mode, the entering the second mode comprising:

placing the SDIO bus into a one bit mode using a first line in the SDIO bus for data transfer;

configuring a SDIO bus controller to receive an incoming interrupt from a peripheral device on a second, different line; and gating a SDIO clock configured to provide timing for data transfer along the SDIO bus and using an external clock to provide the timing for the data transfer along the SDIO bus, wherein the external clock maintains a lower rate for data transfer than the SDIO clock.

2. The one or more non-transitory computer-readable storage media of claim 1, wherein the electrical device consumes less electrical power when in the second mode than in the first mode.

3. The one or more non-transitory computer-readable storage media of claim 1, wherein the determining that the bus is idle comprises receiving a command completion response from the peripheral device indicating that data transfer along the SDIO bus is complete.

4. The one or more non-transitory computer-readable storage media of claim 1, wherein the determining that the elapsed time since the last transfer of data over the SDIO bus exceeds the time threshold comprises determining that the elapsed time since the last transfer of data over the SDIO bus exceeds the time threshold, excluding a transfer of data associated with a polling command.

5. The one or more non-transitory computer-readable storage media of claim 1, wherein the wireless the network interface within the electronic device comprises the peripheral device within the electronic device.

6. The one or more non-transitory computer-readable storage media of claim 1, wherein the first line in the SDIO bus comprises a data 0 line.

7. The one or more non-transitory computer-readable storage media of claim 1, wherein the second line in the SDIO bus comprises a data 1 line.

8. An electronic device comprising:
a processor;
a secure digital input/output (SDIO) bus coupled to the processor; and
a module executable by the processor to:
receive an interrupt from a line on the SDIO bus when a peripheral device coupled to the SDIO bus has data to transmit to the processor;
enable a bus controller clock configured to provide timing for data transfer along the SDIO bus;
transition the SDIO bus from a lower bit rate mode to a higher bit rate mode;
transfer data along the SDIO bus using the higher bit rate mode;
determining that an elapsed time since the data was transferred along the SDIO bus exceeds a time threshold; and
at least partly in response to the determining that the elapsed time since the data was transferred along the SDIO bus exceeds the time threshold:
transitioning the SDIO bus from the higher bit rate mode to the lower bit rate mode, wherein a wireless network interface of the electronic device is configured to maintain connectivity with an access point while the SDIO bus is in the lower bit rate mode; and
gating the bus controller clock and switching to an external clock, wherein the external clock provides timing for data transfer along the SDIO bus in the lower bit rate mode.

9. The electronic device of claim 8, wherein the bus controller clock operates at a frequency of one megahertz or greater.

10. The electronic device of claim 8, wherein the lower bit rate mode comprises a single bit mode.

11. The electronic device of claim 8, wherein the higher bit rate mode comprises a four bit mode.

12. The electronic device of claim 8, wherein the determining that an elapsed time since the data was transferred along the SDIO bus exceeds a time threshold comprises determining that an elapsed time since the data was transferred along the SDIO bus exceeds a time threshold, excluding data associated with a polling command.

13. The electronic device of claim 8, wherein the SDIO bus comprises a multimedia card interface.

14. The electronic device of claim 8, wherein the determining that the elapsed time since the last transfer of data exceeds the time threshold comprises determining that the elapsed time since the last transfer of data exceeds the time threshold, excluding transfers of data associated with polling commands or polling requests.

15. The electronic device of claim 14, wherein the transitioning and gating also occurs at least partly in response to receiving a command completion response from peripheral device.

16. An electronic device comprising:
a processor;
a secure digital input/output (SDIO) bus coupled to the processor and configured to couple to a peripheral device; and
a module executable by the processor to:
determine that the SDIO bus is free from data transfer for an idle time exceeding an idle time threshold;
at least partly in response to determining that the SDIO bus is free from data transfer for the idle time exceeding the idle time threshold, transition the SDIO bus from a first bit rate data transfer mode to a second lower bit rate data transfer mode, wherein a wireless network interface of the electronic device is configured to maintain connectivity with an access point while the SDIO bus is in the second, lower bit rate date transfer mode; and
gate a bus controller clock configured to provide timing for data transfer along the SDIO bus in the first bit rate data transfer mode and switching to a different clock to provide timing for data transfer along the SDIO bus in the second, lower bit rate data transfer mode.

17. The electronic device of claim 16, wherein the first bit rate data transfer mode comprises a four bit data transfer mode.

18. The electronic device of claim 16, wherein the second, lower bit rate data transfer mode comprises a single bit data transfer mode.

19. The electronic device of claim 16, wherein the determining that the SDIO bus is free from data transfer for an idle time exceeding an idle time threshold comprises determining that the SDIO bus is free from data transfer for an idle time exceeding an idle time threshold, excluding data associated with a polling command.

20. The electronic device of claim 16, wherein the module is further configured to:
transition the SDIO bus from the first bit rate data transfer mode to the second, lower bit rate data transfer mode at least partly in response to receiving a command completion response from the peripheral device.

21. The electronic device of claim 16, wherein the peripheral device comprises the wireless network interface device of the electronic device.

22. The electronic device of claim 16, wherein the wireless network interface is configured to maintain the connection to the access point while the bus controller clock is gated.

23. The electronic device of claim 16, wherein the SDIO bus comprises a multimedia card interface.

* * * * *